Jan. 8, 1946.   I. FANKUCHEN   2,392,528
ORIENTATION OF CRYSTALS
Filed Aug. 27, 1942
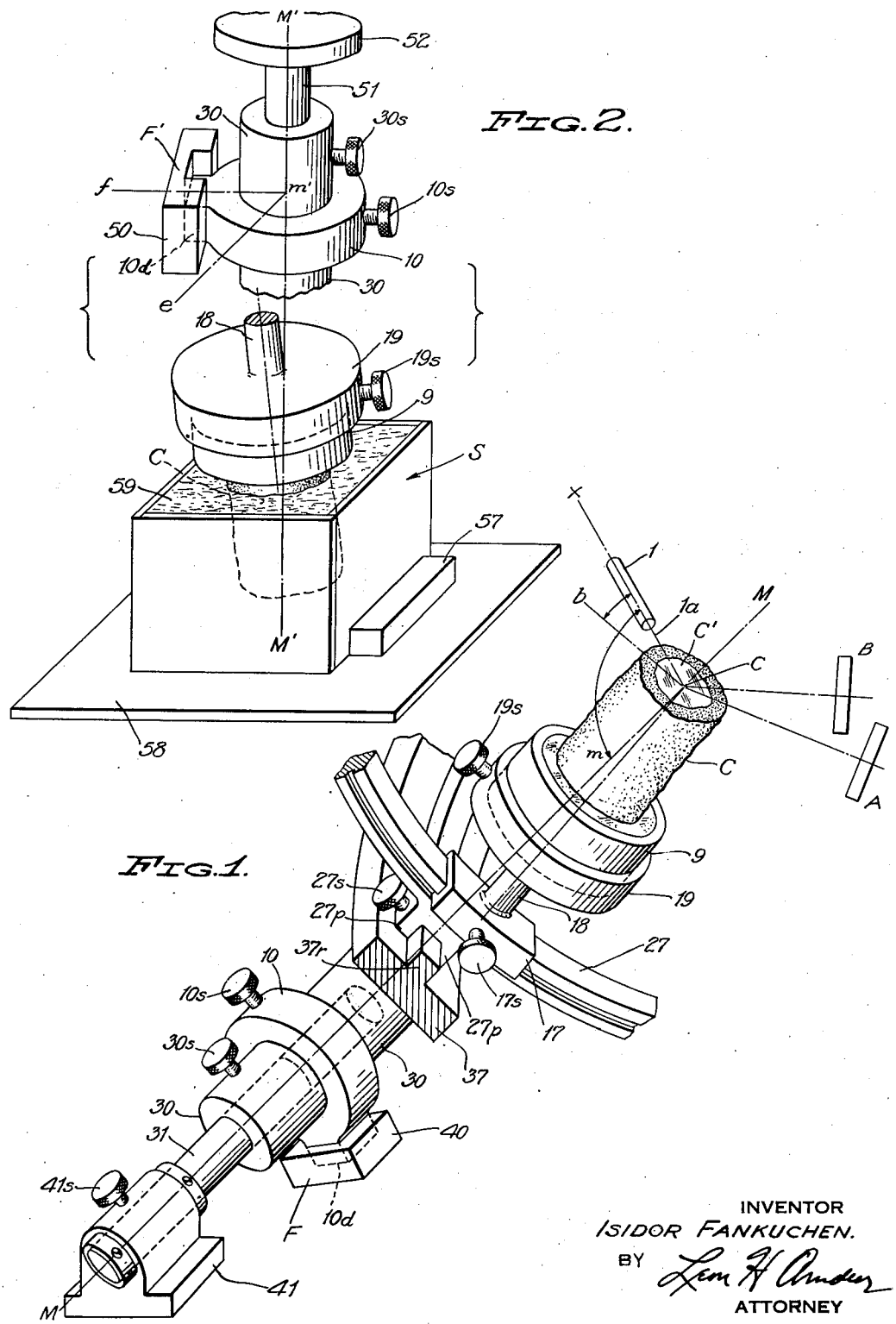
INVENTOR
ISIDOR FANKUCHEN.
BY
ATTORNEY Patented Jan. 8, 1946

2,392,528

UNITED STATES PATENT OFFICE 2,392,528

ORIENTATION OF CRYSTALS

Isidor Fankuchen, Brooklyn, N. Y.

Application August 27, 1942, Serial No. 456,339

14 Claims. (Cl. 51—277)

This invention relates to the orientation of crystals, more particularly, the orientation of crystals by means of X-ray diffraction. In many fields it is important to know the precise orientation of one or more crystallographic axes or directions. One of such fields is in the preparation of piezo-electric crystals, such as quartz; in this particular instance it is highly important to determine the crystallographic axes in order to fix the angles or directions in which to cut or slice the crystal lump (mother crystal) in forming the final product.

In the following specification of my invention the application of my novel methods, procedures and apparatus will be described in connection with the orientation and cutting of quartz piezoelectric crystals, although it is to be understood that my invention is in no way limited to quartz or to piezo-electric crystals, and is not confined to the orientation of crystals for cutting purposes.

The methods now employed in the orientation and preparation of quartz crystals for cutting and other purposes, employing X-ray diffraction phenomena, are very unsatisfactory, laborious, time-consuming, and, moreover, are incapable of precise orientation without inordinate expenditure of time. Presently employed orientation methods are subject to at least the following difficulties and drawbacks: Numerous scale readings, some of which are vernier, must be taken (an especially bad feature in large-scale production); the crystal must be transferred from one setting, after one determination and reading or readings have been made, to other settings, to make other determinations and readings—this results in loss of time, and, more important, likely loss in the accuracy of the setting; moreover, the crystal is required to be marked at completion of some or all of the steps or determinations.

One object of this invention is to devise a method and apparatus to enable complete orientation of a crystal with a single setting, i. e., without the need of resetting or otherwise disturbing the crystal, and to enable this to be done on a single machine or device. Allied with this object is to devise a method and apparatus enabling a complete orientation to be made without the need of taking scale readings; i. e., the adjustments or manipulations require merely the observation of a simple indicator, pointer or the like, such as the intensity of a fluorescent screen, or the meter of an ionization chamber, etc., without knowing the exact value thereof.

Another object of this invention is to devise a method and apparatus which requires neither intermediate nor final markings upon either the crystal itself or its holder. This object should be stressed because intermediate markings, as are required in presently employed methods, not only are wasteful of time and are ill-fitted for large-scale production, but are also conducive to loss in accuracy. The method and apparatus of this invention are admirably suited for large-scale production—which is a further important object of this invention—as contrasted with presently employed methods, for at least the following reasons: the improved method and apparatus of this invention requires the minimum number of manipulations—none of which calls for crystal re-setting or marking; the procedure may be expeditiously and quickly carried out, in a single machine; the manipulation may be performed by semi-skilled operators who could be trained in a short time.

A still further object of this invention is to provide a method or procedure and apparatus or device employing X-ray diffraction phenomena which will enable the observed determinations to be made with the highest degree of accuracy.

For the attainment of the foregoing objects and such other objects as may herein appear or be pointed out, I have shown one embodiment of my invention in the accompanying sheet or drawings, wherein:

Fig. 1 is an isometric view of a preferred form of apparatus for the orientation of crystals according to the novel process of this invention; and Fig. 2 is an isometric view of a removable, major portion of the orientation apparatus of Fig. 1, in a secondary position for mounting the crystal preparatory to cutting or other treatment.

A mother crystal or crystal lump, C, of quartz (or other material) is prepared for mounting in the orientation apparatus of Fig. 1 in the following manner: By means of polarized light the optic axis of the crystal, in the case of quartz (in the case of other materials, other preferred crystallographic direction or directions may be selected by criteria other than the use of polarized light), is first approximately located, and two parallel flats are formed at the extremities of the crystal lump as approximately normal to the optic axis (or other crystal direction) as is possible; one of the said pair of flats appears in Fig. 1, where it is designated C'. The crystal lump is then mounted on a base (9), which may be a thin disc or a thicker cylinder, by means of wax, cement, or the like, applied to the bottom flat surface. The apparatus is provided with a plurality or series of discs or cylinders of graduated thickness—depending upon the height of the crystal lump—is selected (the reasons therefore being more fully explained subsequently). The base 9, with the crystal lump adhered thereto, is then placed within socket 19 and held securely in place by means of set screw 19s.

The socket 19 is integrally mounted at one end of a short rod 18 which projects from a rider 17 which is slidably mounted on an arcuate member 27. The arcuate member 27 is provided, substantially centrally located thereon, with a pair of dependent projecting lugs 27p, which fit slidably over a rail 37r projecting upwardly from a second arcuate member 37. The second arcuate member 37—which is shaped in the form of an exaggerated T—is integrally mounted at one end of a sleeve 30, which is, in turn, rotatively and removably mounted on a spindle 31. That is, one end of spindle 31 is received in sleeve 30; the sleeve may be rotatively and axially adjusted on the spindle and may be locked thereon by means of set screw 30s. The other end of the spindle is journalled in machine bearing 41, in which the spindle may be locked as by means of set screw 41s.

The arcuate members 27 and 37, which are preferably at 90° to each other, have a common center of curvature, c, which lies in the center line M—M of spindle 31 and sleeve 30. It is thus seen that rider 17 may be adjusted along its arcute slide member 27 (and locked in adjusted position by set-screw 17s) and that arcuate member 27 itself may be adjusted along the second arcuate member 37 (and locked in adjusted position by set screw 27s), both adjustments being made about the said common center of turning c of the two arcuate members. While the means for making the two angular adjustments shown in Fig. 1 (the two arcuate members 27 and 37 disposed normally to each other) is preferred, other means may be used.

A slit system, preferably of circular shape, is provided to define a suitable collimated beam of X-rays, diagrammatically represented in Fig. 1 by the tube 1. X-ray beam 1a is directed to intersect the axis M—M. The plane defined by machine axis M—M and X-ray beam 1a will be hereinafter referred to as the reference plane.

A crystal-mounting base 9 is selected from the series of graduated bases, of such thickness (or height)—depending upon the height of the particular crystal lump—that the plane of one of its flattened surfaces C' will be made to coincide as closely as possible with the said point of intersection of X-ray beam 1a and machine axis M—M. Then, by means of the axial adjustment provided by sleeve 30 and spindle 31, the said point of intersection is brought finally and precisely in the plane of crystal surface C'.

Tube 1 and its beam 1a is set at an angle xcm to machine axis M—M. This is a critical angle equal to 90°+ angle xcb, where angle xcb is the Bragg angle as employed in Bragg's law. Angle xcm is thus also a critical angle which is a function of the order of the reflection of the basal planes (in the case of quartz) and of the wave length of the characteristic radiation used. Two suitable X-ray sensitive devices (designated A and B in Fig. 1), such as fluorescent screens, ionization chambers, etc., are located in pre-determined positions which will be more fully described subsequently.

When the X-ray beam 1a is permitted, as for example by opening a shutter, to fall upon crystal surface C' at point c, there generally will be no response in indicator A—ignoring at this time, the second indicator B. The device is turned in the bearing 41 about its axis M—M, to bring either one of the two arcuate members 27 and 38 into the aforesaid reference plane, which is described above as the plane determined by lines xc and MM (and may, if desired, be locked by set-screw 41s). We will assume for purposes of exposition, that arcuate member 27 has been brought into the reference plane. Then its rider 17 is adjusted along arcuate member 27 until a maximum indication is obtained in indicator A. The device is then turned (unlocking 41s, if it had previously been secured) 90° to bring the other arcuate member 37 into the reference plane, and a like adjustment is made by sliding 27 (and, of course rider 17 and crystal socket 19) along the second arcuate member 37, more particularly along its rib 37r, until a second maximum indication is obtained in indicator A. These adjustments are repeated to arrive at a final positioning. In practice a single readjustment of each arcuate member, if the operator is careful, will suffice to bring the machine to the required final position of the first step.

As a result of these adjustments, the crystal lump (in the case of quartz) will be so oriented that the direction of its optic axis (or other prechosen crystal direction for other cases) will be precisely parallel to machine axis M—M, as distinguished from the rough approximation with which the crystal lamp was initially mounted in the device.

After making the foregoing adjustments, a check is made of their accuracy in the following manner: The device is slowly turned about its axis M—M; if the adjustment has been properly made, indicator A remains at its maximum value, i. e., without fluctuation, as the rotation continues.

The second and final step in the orientation procedure is the slow turning of the device (about 120° or less in the case of quartz) in its bearing 41 about its axis M—M, until a maximum value is reached in indicator B. As a result of this second and final adjustment, the directions of the three electrical axes (in the case of quartz) is determinate and fixed relative to the reference plane and to the machine itself—whereat the device is locked against turning by means of set screw 41s.

It will be recalled that indicator A, Fig. 1, is used in carrying out the first step (that of orienting the optic axis, in the case of quartz, parallel to the machine axis M—M) and that indicator B is used in carrying out the second step (that of fixing the orientation of the equivalent electrical axes, in the case of quartz, relative to the machine). The locations of the two indicators A and B, positioned at different points on the machine, depend upon the particular Bragg planes selected in the first and second steps, respectively.

Still considering quartz by way of example, the plane in the crystal selected to reflect to indicator A will be a convenient order of the basal plane (0003, for example), which plane will be normal to the optic axis. Depending upon the order of the reflecting plane chosen, the actual physical position of indicator A will be established.

As the crystal is turned about the machine axis M—M (as a part of the second step, as described above), the said basal Bragg planes remain constantly in reflecting positions, so that indicator A remains at a constant value. The constancy of indicator A—which itself is not used in carrying out the second step—does, however, serve as an ever-present check assuring that the adjustment or setting of the first step is not disturbed. As the crystal is turned about axis M—M, other Bragg planes pass through reflecting positions. (However, many such planes reflect in directions such that their reflections are absorbed in the body of the crystal.) The set of Bragg planes, of indices (hkl) where 1±0, required to reflect to indicator B is selected from those planes whose reflections are not absorbed in the body of the crystal. (However, other considerations necessary in determining the direction of cut subsequently to be described, will impose further limitations on the choice of Bragg planes (hkl) for reflecting to indicator B.) The physical location of indicator B will depend upon the particular set of planes (hkl) selected. (This location of indicator B is readily computed by known reciprocal lattice methods.)

After the direction of the optic axis is determined (first step, above) and the directions of the equivalent electrical axes are determined (second step, above), it is still necessary to determine, for cuts taken at an angle (other than 90° or 0°) to the optic axis, whether such oblique cuts are to be taken to the left or to the right of the optic axis (i. e. the "sense" of the cut). Such further determination, required in presently employed procedures, is time-consuming and often inaccurate and wasteful of material. In the improved process of this invention, however, such further determination or determinations are dispensed with for the reason that the second step, above, will not only orient the electrical axes but will also reveal on which side of the optic axis the particular crystal should be cut.

It was stated above in connection with the selection of a set of planes (hkl) to reflect to indicator B, that such plane selection is made, in the improved process, having in consideration the concurrent determination of the sense of the cut. It is an established fact that, in the case where 1±0 the intensity of a reflection (hkl) will generally be different from the intensity of a reflection $(\bar{h}\bar{k}l)$. The set of planes (hkl) selected for the concurrent carrying out of the second step (orientation of the electrical axes) and the determination of the sense of cut, is such that the intensity of reflection (hkl) will be markedly different from the intensity of reflection $(\bar{h}\bar{k}l)$. It is possible in some materials, quartz for example, to find a pair of planes (hkl) and $(\bar{h}\bar{k}l)$ such that the intensity of reflection from one of the pair will be almost negligible.

By reason of the threefold symmetry of quartz, the reflection (hkl) will occur three times in a complete rotation (every 120°) about the optic axis, i. e., since this axis is parallel to the machine axis M—M (first step), three times in a complete rotation of the device, including crystal C, of Fig. 1. For the same reason, the reflection $(\bar{h}\bar{k}l)$ will occur in the same manner. Considering both reflections of type (hkl) and type $(\bar{h}\bar{k}l)$ it will be seen that turning of the crystal about machine axis M—M will cause alternate (strong and weak) reflections every 60°. By choosing, as suggested above, a pair of planes (hkl) and $(\bar{h}\bar{k}l)$ such that the reflection from one of the pair will be too weak to be perceptibly registered on indicator B, there will occur during a complete 360° rotation a clearly recognizable absolute maximum signal in indicator B every 120° of turning.

It will thus be seen that for the purposes of the second step (orientation of the equivalent electrical axes) an indication or reflection (alternately strong and weak) may occur every 60°, and that for the purposes of fixing the sense of cut an indication or reflection (not alternating, but of definite maximum intensity) is made to occur every 120°. Inasmuch as it is desirable that the determination of the sense of cut be made, as proposed above, concurrently with the second step determination (and dependent upon a single empirical test initially made upon the material, e. g. quartz, of which the crystals are composed, as will be more fully explained below), the indication or reflection in the combined determination (second step and sense of cut) is made, in the improved method of this invention—by proper selection of the Bragg planes, as explained above—to occur every 120°.

Confining our attention to the determination of sense of cut, the question is resolved simply to this: having fixed (i. e., relatively to the reference plane and the machine) one of the electrical axes, shall the cut be made to the left, or shall it be made to the right, of the optic axis? In the practice of my improved method, that question is resolved by a single empirical test initially made upon the material under observation—quartz in the example taken throughout this specification. In making this initial empirical test of the material, after a specimen mother crystal or crystal lump of the particular matter has been properly fixed relative to the machine in accordance with the first and second steps described above, two test plates are cut from the crystal at the desired angle to the optic axis, one on each side thereof (i. e., opposite sense of cut). Both crystal plates are subjected to known tests to ascertain which one of the two opposite senses will produce the desired results. Other ways of ascertaining the proper sense in which to cut the crystal lump may be employed, such as the use of a crystal whose polarity and right or left handedness have been already established. All subsequent cuts of the tested material and of the type desired are made in accordance with the foregoing empirical test without regard to the right and left handedness of the crystal lumps being oriented.

An important feature of the combined test to determine direction of electrical axes and sense of cut is that the test is always positive in character and in no way depends upon the occurrence or non-occurrence of a particular phenomenon. By way of explanation, physical tests may be of two general types, which we might designate "positive-in-character" and "negative-in-character." By "positive-in-character" is meant a test in which the result depends entirely upon the occurrence of a definite and predetermined physical occurrence. By "negative-in-character," on the other hand, is meant a test the determination of which depends upon whether a predeterminate phenomenon does or does not occur. The obvious drawback and disadvantage of tests which are negative-in-character is the possibility that the non-occurrence of the expected phenomenon is due to some defect in the apparatus or procedure, and not to the non-existence or absence of the conditions which ordinarily should result in the expected occurrence. This disadvantage of tests which are negative - in - character is particularly serious where the phenomenon relied upon is of a critical nature, such as is the case in the reflection of monochromatic X-rays by crystals.

This difficulty common to tests which are negative-in-character is present in prior art process for finding the sense of cut, in which an incident X-ray beam is directed to reflect from the apex faces of a quartz crystal and recorded by a radiation sensitive device which is set up at a pre-determined and fixed angle to the incident beam. The mother crystal or crystal lump is then cut or sliced in one sense or the other depending upon whether or not the said radiation reflected is recorded in the pre-located sensitive device. This prior art procedure—which incidentally can be applied only to crystals having apex faces when in a perfect, natural state—depends therefore upon the non-occurrence of the expected phenomena, which might be due to inept technique, defect in apparatus, or imperfection in the physical condition of the crystal face or its crystallographic inclination, rather than to the non-existence of the condition which should result in "negative" test.

The improved process of this invention, being a positive-in-character test and not a negative-in-character test, as is the said prior art process, is therefore not subject to its mentioned drawbacks. Hence, there is no possibility that a mother crystal or crystal lump will be wasted because of cutting in the wrong sense due to a mistaken observation.

Summarizing, the first step (turning adjustment of rider 17 and first arcuate member 27 about their common center of radius or turning c) has resulted in orienting the crystal lump so that its optic axis is parallel to machine axis M—M; the second step (turning adjustment of the entire device—from the crystal to sleeve 30—in fixed bearing 41 about the machine axis M—M) has resulted in further orienting the crystal lump so that its electrical axes are in definite directions relative to the reference plane (and relative to the device itself). Having determined i. e. relative to fixed and known points of the device) the optic axis and the electrical axis of the crystal lump, and having ascertained—by the single empirical test (for quartz, for example)— the sense in which to cut the crystal lump, the crystal lump is now ready to be mounted preparatory for cutting or slicing, or other treatment (such cutting or other treatment being performed on a separate device or vise). I have found it preferable to mount the crystal on a separate device and not while it is held in the orienting device of Fig. 1. In order to distinguish these different devices or positions, the apparatus shown in Fig. 1 will be referred to as the "orienting device"; the apparatus shown in Fig. 2 (and fully described subsequently), for mounting the crystal lump preparatory to cutting, will be referred to as the "mounting device"; and the cutting machine or machine for other treatment, not shown, will be referred to as the "cutting device."

Referring to Fig. 1, at the completion of the first and second steps the crystal lump C will be oriented so that its optic axis is parallel to the machine axis M—M, i. e., parallel to the center line passing through spindle 31 and machine bearing 41, and so that the direction of one of its electrical axes will be oriented at a pre-determined angle relative to the reference plane (through machine axis M—M and the line of the incident X-ray beam 1a), i. e., relative to the machine, as for example to a point F in the frame of the machine. (Fixed point F, which will be described more fully subsequently, may be placed at any position relative to the aforementioned reference plane, but for convenience will be assumed to be placed directly in that plane.) The angle between a particular one of the electrical axes and the normal from point F to machine axis M—M will be hereinafter referred to as the "locking angle" for reasons soon apparent.

At the completion of the two steps of the orientation procedure, crystal C will be oriented so that: (1) its optic axis is parallel to machine axis M—M, and (2) its electrical axes, more particularly, the nearest one to point F, makes a pre-determined angle with the normal from point F to the machine axis M—M (the "locking angle"). In order that the assembly of parts (including the crystal lump held therein) may be placed in the mounting device (shortly to be described more fully) so that the said electrical axis will be positioned in a definite angular direction, means are provided in association with the assembly to preserve the said locking angle as pre-determined in the orienting device (Fig. 1). Such means comprise a fixture 10 in the form of a collar encircling sleeve 30, see Fig. 1. Fixture or collar 10 has a set screw 10s by which it may be locked in place on sleeve 30. Collar 10 is also provided with a projecting dog 10d which is slidably received between a pair of rails in block 40, which is secured to the machine frame at the aforementioned point F. Rail block 40 serves two purposes; in the first place, it serves to hold collar 10 against turning as the sleeve 30 (and the entire assembly) is turned about machine axis M—M. In the second place, after the fixture is locked to sleeve 30 by set screw 10s, the rail block 40 serves to preserve the said locking angle. That is, when fixture 10 is locked (by its set screw 10s) to the assembly of parts, more particularly, to sleeve 30, the selected (i. e. nearest) electrical axis will be at a definite angle—the locking angle—to the normal from point F to machine axis M—M, i. e. to a radius line from axis M—M to dog 10d of fixture 10.

A rail block 50, similar to block 40 of the orienting device, is provided in the mounting device, Fig. 2, at a convenient point F' and positioned the same distance or radius from suspension axis M'—M' (Fig. 2) that point F is from machine axis M—M (Fig. 1) so that the dog 10d of fixture 10 is received between the rails of block 50. Hence when the assembly is placed in the mounting device of Fig. 2, the equivalent electrical axes will be in definite angular positions (the significance of which will be explained after the following description of the mounting of the crystal).

In order that the crystal lump may be cut at any desirable angle, the crystal is firmly embedded in a block of suitable molding material, such as paraffin, plaster, etc. (In cutting the crystal, the cutting tool or tools cut through the blocks of molding material as well as through the crystal lump.) The crystal is roughly centered and immersed in a collapsible mold 59, Fig. 2, containing the molding liquid, and resting on table 58 of the mounting device.

To facilitate the centering and setting of the crystal in the mold, the crystal lump C, and in fact the major portion of the orienting device of Fig. 1, from the crystal base 9 to the sleeve 30—that is, all parts thereof except machine base 41 and its spindle 31—is suspended, as clearly shown in Fig. 2. For this purpose there is provided a short vertical spindle 51 suspended from an elevated bracket 52. Vertically suspended spindle 51, Fig. 2, is of the same diameter as spindle 31 of the orienting device, Fig. 1, so that sleeve 30, removed with the assembly from spindle 31, may be fitted on suspended spindle 51.

After fixture 10 is securely locked, with its dog 10d held in rail block 40, to sleeve 30—i. e., in effect, to the entire assembly—set screw 30s (if it had been previously locked) is loosened and the sleeve 30 (with the rest of the assembly) is withdrawn, together with fixture 10 locked to the sleeve as described, from its support position on machine spindle 31. During this withdrawal (to the right as viewed in Fig. 1), fixture dog 10d is withdrawn in the same rightward direction, from the rails—open at its right end—of rail block 40.

The "locking angle" is shown in Fig. 2 as the angle fm'e. The value of the locking angle (angle fm'e) is computable from the physical constants of the material being handled—quartz, in the example taken—and the indices (hkl) etc. The cut taken through a crystal is usually specified by the angles the cut makes with certain crystallographic axes. For example, in the case of quartz used for piezo-electric elements, one type of cut contains the electrical axis and makes an angle of 35° with the optic axis. In mounting a crystal lump for this type of cut, it is convenient to orient one side of the mold 59, designated S in Fig. 2, in a direction parallel to the selected electrical axis (e.m). The side of the mold 59 is made vertical and consequently parallel to the suspension axis M'—M' and the optic axis. For the purpose of providing a convenient means for placing the mold (59) on the table 58 so that its side S will be parallel to the electrical axis, a guide bar 57 is provided on table 58.

Means (not shown) are provided to assure that mold 59 will be properly placed on table 58, with the proper face (the side designated as S in Fig. 2) against the guide bar 57. Means (not shown) are also provided on the mold 59 to leave an indentation or other indication on the block of molded material in which the crystal is embedded. This is required to assure that the block will be placed on the cutting device in the proper orientation for the type of cut or other treatment desired.

I claim:

1. The method of orienting a rough crystal lump whose optic and electrical axes are not known, preparatory to cutting into piezo-electrical elements cut at prescribed angles to the said axes and in a prescribed sense, comprising the steps of approximately locating the optic axis, providing a pair of parallel surfaces at each end of the crystal lump substantially normal to the said optic axis, directing an X-ray beam to be incident to a point on one of the said surfaces at a pre-calculated critical angle depending upon the crystal material, angularly adjusting the crystal lump about the said point of incidence to obtain a maximum reflection from a set of Bragg planes which are approximately parallel to said surfaces into a radiation sensitive device, whereby the optic axis of the crystal is oriented in a preselected direction, turning the crystal lump about the said optic axis of the crystal to obtain a second reflection from a second set of Bragg planes into a second radiation sensitive device, whereby the electrical axes are oriented in preselected directions and whereby the sense of cut is established.

2. In an apparatus for orienting a rough crystal lump, the direction of whose optic axis has been approximately marked on the lump by a pair of parallel surfaces but the direction of whose electrical axes are not known, for subsequent cutting into piezo-electrical elements at prescribed angles to the said axes, the combination of means for defining a directed X-ray beam, means including a spindle and a crystal holder for angularly adjusting the crystal about a point in one of the said crystal surfaces and on the axis through the said spindle and for turning the crystal about the said spindle axis, the said spindle axis intersecting the X-ray beam to make a pre-calculated critical angle therewith depending upon the crystal material, means for axially adjusting the crystal to contain the said point of intersection in one of the said parallel faces, a radiation sensitive device associated with the said means for angularly adjusting the crystal, adapted to receive radiations reflected by the crystal during the said angular adjustment, and a second radiation sensitive device associated with the said means for turning the crystal about the spindle axis, adapted to receive radiations reflected by the crystal during the said turning.

3. In an apparatus for orienting rough crystal lumps of different heights the direction of one of whose crystal directions has been approximately marked in the lump by a flat surface, the combination of means for defining a directed X-ray beam, means for angularly adjusting the crystal about a point including a pair of arcuate members having a common center of curvature coincident with the said point of angular adjustment, means for holding a crystal lump and adapted to adjust the lump to cause its said flat surface to contain the said point, means for turning the crystal about an axis, the said axis of turning and the said X-ray beam intersecting at a second point, and means for adjusting the crystal holder and the crystal to bring both points into coincidence.

4. The process of preparing for cutting a rough crystal lump whose optic and electrical axes are not known, into piezo-electrical elements cut at prescribed angles to the said axes and in a prescribed sense, comprising the steps of making an initial test of the crystal material to determine empirically the sense of cut, approximately locating the optic axis, providing a pair of parallel surfaces at each end of the crystal lump substantially normal to the said optic axis, directing an X-ray beam to be incident to a point on one of the said surfaces at a pre-calculated critical angle which depends upon the crystal material, angularly adjusting the crystal lump about the said point of incidence to obtain a maximum reflection from a set of Bragg planes which are approximately parallel to said surfaces into a radiation sensitive device, whereby the optic axis of the crystal is oriented in a pre-selected direction, turning the crystal lump about the said optic axis of the crystal to obtain a second reflection from a second set of Bragg planes into a second radiation sensitive device, whereby the electrical axes are oriented in pre-selected directions, and whereby the sense of cut is established in accordance with the said empirical test, embedding the said crystal lump in a mold containing molding material in fluid state to form a molded block of pre-determined shape holding the said crystal lump in a pre-determined orientation, presenting the said block for cutting the said embedded crystal lump into piezo-electrical elements at the said prescribed angle and sense.

5. The process of treating a rough crystal lump whose crystallographic axes are not known, at prescribed directions to the said axes, comprising the steps of approximately locating a selected crystal direction, providing a pair of parallel surfaces at each end of the crystal lump substantially normal to said direction, directing an X-ray beam to be incident to a point on one of the said surfaces at a pre-calculated critical angle which depends upon the crystal material, angularly adjusting the crystal lump about the said point of incidence to obtain a maximum reflection from a set of Bragg planes which are approximately parallel to said surfaces into a radiation sensitive device, whereby the said selected crystal direction is oriented in a pre-selected direction, turning the crystal lump about said crystal direction to obtain a second reflection from a second set of Bragg planes into a second radiation sensitive device, whereby a second selected crystal direction is oriented in a pre-selected direction, embedding the said crystal lump in a matrix of predetermined shape to hold the said crystal lump in a predetermined orientation, presenting the said matrix for treating the said embedded crystal lump at prescribed directions.

6. In an apparatus for orienting a rough crystal lump, the combination of a means for defining a directed X-ray beam, means for angularly adjusting the crystal about a point and for rotating the crystal about an axis, the said axis making a pre-calculated critical angle with the said X-ray beam which depends upon the crystal material, a radiation sensitive device associated with the said means for angularly adjusting the crystal and adapted to receive radiations reflected by the crystal during the said angular adjustment and a second radiation sensitive device associated with the said means for turning the crystal about the said axis and adapted to receive radiations reflected by the crystal during the said turning.

7. A method for orienting two definable directions within a rough crystal lump only one of which is approximately known, comprising the steps of providing a radiation sensitive indicator, directing an X-ray beam to be incident on a point on said crystal, manipulating the said crystal until the said indicator signals that the said approximately known direction has been exactly oriented, providing a second radiation sensitive indicator, further manipulating the crystal lump until the signal of the second indicator signals that the second of the said two directions has been exactly oriented, said further manipulation being conditioned upon the persistence of the first said significant indicator signal.

8. A method for orienting a rough crystal lump only one of whose crystal directions is approximately known, comprising the steps of providing a radiation sensitive indicator, directing an X-ray beam to be incident on a point on said crystal, manipulating the said crystal until the said indicator signals that the said approximately known direction has been exactly oriented in a predetermined manner, providing a second radiation sensitive indicator, further manipulating the crystal lump until the signal of the second indicator signals that a second crystal direction has been exactly oriented in a predetermined manner, said further manipulation being conditioned upon the persistence of the first said significant indicator signal.

9. A process for orienting a rough crystal lump of a particular material, preparatory to cutting into piezo-electrical elements cut at prescribed angles to the optical and electrical axes and in a prescribed sense based upon an empirical test of the said particular material, comprising the steps of mounting the crystal for turning about an axis, orienting the crystal so that its optic axis is coincident with the said axis of turning, selecting a prescribed direction normal to the said axis of turning, further orienting the crystal so that one of its electrical axes is parallel to the said selected direction and so that the sense of cut is determined in accordance with the results of the said empirical test of the particular material of which the rough crystal lump being oriented is constituted.

10. The process of preparing a rough crystal lump whose crystallographic directions are not known by mounting the lump in a block of matrix material with its crystallographic directions oriented relative to the confines of the said matrix block, comprising the steps of orienting the crystal lump in an orienting device by causing one of its crystallographic directions to be coincident with the orienting device axis and by causing a second of its crystallographic directions to make an ascertainable angle relative to a radius line through a point on the said orienting device, and transferring the said oriented crystal to a mounting device with its said first crystallographic direction coincident with the mounting device axis and with the said second crystallographic direction angularly positioned from a radius line through a point on the said mounting device corresponding to the first said point of the orienting device, presenting a mold of the matrix material to the said mounting device with one confine direction parallel to the said mounting device axis, whereby the first said crystallographic direction of the crystal lump is oriented relative to the matrix block confines, and with another confine direction parallel to an imaginable line of the mounting device which makes an angle with a line through the said second point of the mounting device equal to the said ascertainable angle, whereby the said second crystallographic direction of the crystal lump is oriented relative to the matrix block confines.

11. The process of preparing a rough crystal lump whose crystallographic directions are not known by mounting a lump in a block of matrix material with its crystallographic directions oriented relative to the confines of the said matrix block, comprising the steps of orienting the crystal lump in an orienting device by causing a selected crystal direction to make an ascertainable angle relative to a radius line through a point on the said orienting device, transferring the said oriented crystal to a mounting device with the said first selected crystal direction coincident with the mounting device axis and with a second selected crystal direction angularly positioned from a radius line through a point on the said mounting device corresponding to the first said point of the orienting device, and presenting a mold of the matrix material to the said mounting device, its confine directions bearing a predetermined relation to the axis of the mounting device to the radius line through said point on said mounting device.

12. The process of orienting and mounting a rough crystal lump whose crystallographic directions are not known, comprising the steps of orienting the crystal lump in an orienting device by causing a selected crystal direction to be coincident with the orienting device axis and by causing a second selected crystal direction to make an ascertainable angle relative to a radius line through a point on the said orienting device, and transferring the said oriented crystal to a mounting device with the said first selected crystal direction coincident with the mounting device axis and with the said second selected crystal direction making the said ascertainable angle relative to a radius line through a point on the said mounting device corresponding to the first said point of the orienting device.

13. In a machine for orienting a rough crystal lump whose crystallographic direction are not known, the combination of means for orienting the crystal lump to cause one of its crystallographic directions to be coincident with an axis of the machine, said means including a sleeve rotatable on said machine axis, means of which the said sleeve forms a part for turning the crystal lump on said machine axis to orient a second of its crystallographic directions at an ascertainable angle of turning relative to a reference line radiating from the said machine axis, and means for angularly locking the said sleeve relative to the said reference radius, said means including a collar rotatively mounted on said sleeve and adapted to be locked therein and provided with a projecting dog and a block located in the said reference radius for slidably receiving the said projecting dog.

14. In apparatus for orienting and mounting a rough crystal lump whose crystallographic directions are not known, the combination of a fixed spindle, means for orienting the crystal lump to cause one of its crystallographic directions to be coincident with the axis of the said spindle, said means including a sleeve rotatable on said spindle axis, means of which the said sleeve forms a part for turning the crystal lump on said spindle axis to orient a second of its crystallographic directions at an ascertainable angle of turning relative to a reference line radiating from the said spindle axis, means for angularly locking the said sleeve relative to the said reference radius, said means including a collar rotatively mounted on said sleeve and adapted to be locked therein and provided with a projecting dog, and a bock located in the said reference radius for slidably receiving the said projecting dog, said sleeve being removable together with the said collar located thereon and together with the remaining parts of the apparatus including the oriented crystal, from the said spindle, a second, vertically-disposed spindle adapted to receive the said sleeve to hold the said assembly of parts in suspension, and means for angularly positioning the second said crystallographic direction relative to a reference line radiating from the second said spindle, said means including a block located in the said reference radius of the vertical spindle and adapted for slidably receiving the said projecting dog of the collar previously locked on the said sleeve at the said ascertainable angle from the second crystallographic direction.

ISIDOR FANKUCHEN.